(12) United States Patent
Willems

(10) Patent No.: US 9,300,188 B2
(45) Date of Patent: Mar. 29, 2016

(54) ELECTRIC DAMPER

(71) Applicant: AUDI AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/390,567

(22) PCT Filed: Mar. 27, 2013

(86) PCT No.: PCT/EP2013/000914
§ 371 (c)(1),
(2) Date: Oct. 3, 2014

(87) PCT Pub. No.: WO2013/149710
PCT Pub. Date: Oct. 10, 2013

(65) Prior Publication Data
US 2015/0054290 A1    Feb. 26, 2015

(30) Foreign Application Priority Data
Apr. 5, 2012 (DE) .......................... 10 2012 007 120

(51) Int. Cl.
| | |
|---|---|
| *H02K 21/04* | (2006.01) |
| *H02K 7/18* | (2006.01) |
| *B60G 13/14* | (2006.01) |
| *B60G 17/015* | (2006.01) |

(Continued)

(52) U.S. Cl.
CPC .............. *H02K 7/1853* (2013.01); *B60G 13/14* (2013.01); *B60G 17/0157* (2013.01); *F16F 15/035* (2013.01); *H02K 7/1892* (2013.01); *H02K 35/04* (2013.01); *B60G 2202/20* (2013.01); *B60G 2204/1162* (2013.01); *B60G 2204/12* (2013.01); *B60G 2204/143* (2013.01); *B60G 2300/50* (2013.01); *B60G 2300/60* (2013.01); *H02P 2101/45* (2015.01)

(58) Field of Classification Search
CPC ....................................................... H02K 21/04
USPC ......................................................... 290/1 R
See application file for complete search history.

(56) References Cited

U.S. PATENT DOCUMENTS

| | | | |
|---|---|---|---|
| 4,815,575 A |  | 3/1989 | Murty |
| 5,053,662 A | * | 10/1991 | Richter ................... F01D 25/04 290/40 A |

(Continued)

FOREIGN PATENT DOCUMENTS

| | | |
|---|---|---|
| DE | 31 16927 | 11/1982 |
| DE | 295 18 322 | 1/1996 |

(Continued)

OTHER PUBLICATIONS

International Search Report issued by the European Patent Office in International Application PCT/EP2013/000914.

*Primary Examiner* — Joseph Waks
(74) *Attorney, Agent, or Firm* — Henry M. Feiereisen LLC

(57) ABSTRACT

The invention relates to an electric damper (10) for damping the relative motion between a first and a second mass, comprising a generator (26) that can be driven by the mass motion. The invention is characterized in that, in addition to the field generating means (18) present in the generator (26), an additional field winding (24) is provided for producing a secondary magnetic field, the additional field winding (24) being arranged in such a way that the primary and secondary magnetic fields have oppositely oriented field lines.

7 Claims, 6 Drawing Sheets

(51) Int. Cl.
  *F16F 15/03* (2006.01)
  *H02K 35/04* (2006.01)
  *H02P 101/45* (2015.01)

(56) References Cited

U.S. PATENT DOCUMENTS

| | | | | |
|---|---|---|---|---|
| 5,089,734 | A * | 2/1992 | Bickraj | H02K 16/005 310/115 |
| 5,091,679 | A * | 2/1992 | Murty | B60G 17/0157 180/165 |
| 7,005,816 | B2 * | 2/2006 | Hio | B60G 17/0165 188/266 |
| 7,868,475 | B1 * | 1/2011 | Bradford | H02K 7/1853 290/1 R |
| 8,183,802 | B2 * | 5/2012 | Quere | H02K 9/06 310/112 |
| 2004/0090295 | A1* | 5/2004 | Yajima | F16F 15/03 335/229 |
| 2006/0144472 | A1* | 7/2006 | Ullakko | B60B 1/045 148/104 |
| 2007/0144842 | A1* | 6/2007 | Zhou | F16F 9/535 188/267 |
| 2013/0049508 | A1 | 2/2013 | Willems | |
| 2013/0154404 | A1 | 6/2013 | Willems | |

FOREIGN PATENT DOCUMENTS

| | | | |
|---|---|---|---|
| DE | 10115 858 | 10/2002 | |
| DE | 10220846 | 11/2003 | |
| DE | 102009048818 | 4/2011 | |
| DK | WO 2007137580 A2 * | 12/2007 | ............... F16F 9/53 |
| EP | 69405756 | 3/1998 | |
| EP | 1650470 | 4/2006 | |
| JP | S6223400 | 1/1987 | |
| JP | H11215900 | 6/1999 | |
| JP | 2000139047 | 5/2000 | |
| JP | 2004215375 | 7/2004 | |
| JP | 2011254599 | 12/2011 | |
| WO | WO 95/02270 | 1/1995 | |
| WO | WO 2011/042085 | 4/2011 | |
| WO | WO 2012/031650 | 3/2012 | |

* cited by examiner

ELECTRIC DAMPER

CROSS-REFERENCES TO RELATED APPLICATIONS

This application is the U.S. National Stage of International Application No. PCT/EP2013/000914, filed Mar. 27, 2013, which designated the United States and has been published as International Publication No. WO 2013/149710 and which claims the priority of German Patent Application, Serial No. 10 2012 007 120.5, filed Apr. 5, 2012, pursuant to 35 U.S.C. 119(a)-(d).

BACKGROUND OF THE INVENTION

The invention relates to an electric damper for damping the relative motion between a first and a second mass.

The underlying operating principle of an electric damper for damping the relative motion between a first and a second mass by using a generator is known from DE 101 15 858 A1. A generator is known to include a stator and a rotor rotatable relative to the stator, and corresponding magnetic field generating means, wherein a current is induced upon rotation of the rotor relative to the stator due to the rotational motion in the magnetic field, i.e. energy is generated. This means that, on the one hand, damping takes place as a result of the energy to be generated for performing the rotational motion in the magnetic field; on the other hand, the energy in form of the generator-side generated current which can be fed into the onboard electrical system can be utilized. It is also known from DE 101 15 858 A1 to provide a gearbox between two damper elements, which converts a linear motion into a rotational motion. Since the current induced by the rotational motion is proportional to the velocity, a proportional curve shape of the damping force characteristic results for the damper according to DE 101 15 858 A1.

SUMMARY OF THE INVENTION

It is the object of the invention to improve an electric damper for damping the relative motion between a first and a second mass such that the damping force characteristic has a degressive curve shape for high damper velocities.

According to an aspect of the present invention, the electric damper for damping the relative motion between a first and a second mass includes in a conventional manner a generator, which can be driven by the mass motion.

In addition to primary field generating means necessary for the induction in the generator, an additional field winding is provided for generating a secondary magnetic field, wherein the additional field winding is arranged and energized so that the primary and secondary magnetic field have field lines oriented in opposite directions.

By providing the additional field winding and the corresponding arrangement thereof according to the present invention, the field strength of the primary magnetic field can be influenced, meaning that the current induced during the rotational motion and hence the curve shape of the damping characteristics can be influenced. The damping characteristics of the damper according to the invention can thus be adjusted in a particularly advantageous manner, i.e. the characteristic curve can also have a degressive curve shape.

Preferably, the electrical conductor for conducting the induced current and the additional field winding are connected to one another in such a way that a portion of the induced current is supplied to the other field winding only when the induced current exceeds a predetermined threshold value. In this way, the additional field winding is energized from a predeterminable value on, which in turn causes the magnetic field to weaken and thus a degressive characteristic curve.

Preferably, the field generating means are formed as a field winding for separate excitation or as permanent magnetic elements for self-excitation.

According to a particularly advantageous embodiment of the invention, the generator is integrated in a gearbox. With this approach, the relative motion between the stator and the rotor of the generator can advantageously be influenced or adjusted.

The gearbox may be constructed in different ways, for example, formed as a strain wave gear or as a planetary gear or as a cycloidal gear.

Further advantages, features and possible applications of the present invention will become apparent from the following description taken in conjunction with the exemplary embodiments illustrated in the drawings.

The invention is described in more detail below with reference to the exemplary embodiments shown in the drawing.

In the description, in the claims and in the drawings, the terms used in the list of the reference characters and associated reference numerals listed below will be used.

BRIEF DESCRIPTION OF THE DRAWINGS

The drawing shows in:

FIG. 1 shows a lever element 100 of a motor vehicle suspension of a motor vehicle. The lever element 100 has a bore 110 in which a damper designated generally by the reference numeral 10 is integrated.

As shown in FIG. 2, the damper 10 is constructed in the form of a planetary gear and includes a first gear element 12 formed as a ring gear and second gear element 14 formed as a sun gear. The first gear element 12 formed as a ring gear is hereby fixedly mounted along its outer circumference in the bore 110 of the lever element 100. The ring gear formed as a first gear element 12 has on the inner periphery an internal gearing which is not shown here for sake of clarity. The second gear element 14 arranged in the center and formed as a sun gear is in meshing engagement with the first gear element 12 having the internal gearing via three planet gears 16 by way of the outside gearing disposed on the sun gear and the planetary gears, is not shown here for sake of clarity.

DETAILED DESCRIPTION OF PREFERRED EMBODIMENTS

A rotational motion of the first gear element constructed as a ring gear 12 initiated by a pivoting motion of the lever element 100 thus causes in a known manner a geared rotational motion in the opposite direction of the direction of rotation of the second gear 14 element formed as a sun gear.

Figure 1:
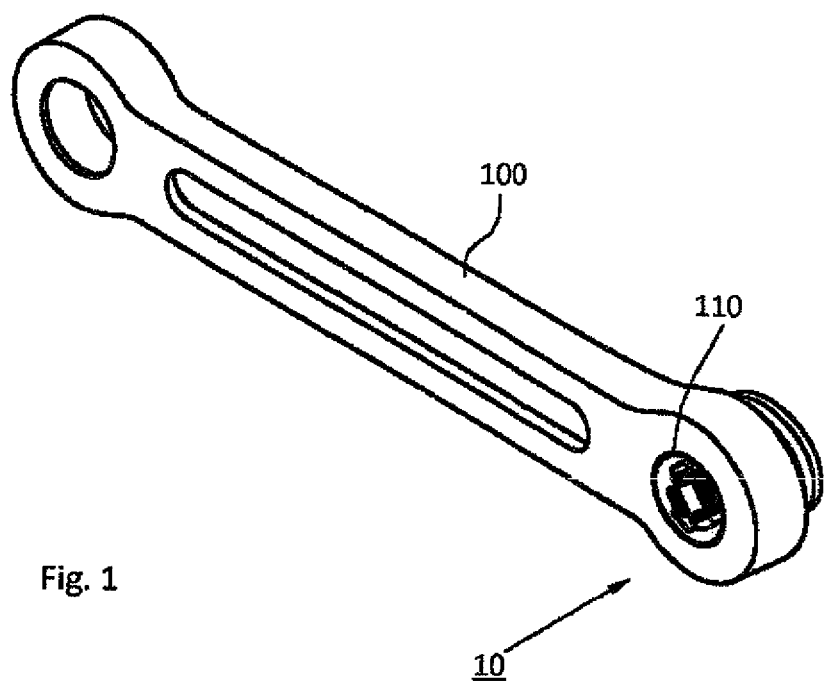
FIG. 1 a lever element of a motor vehicle suspension with an electric damper according to the present invention integrated in a bore of the lever element.
Figure 2:
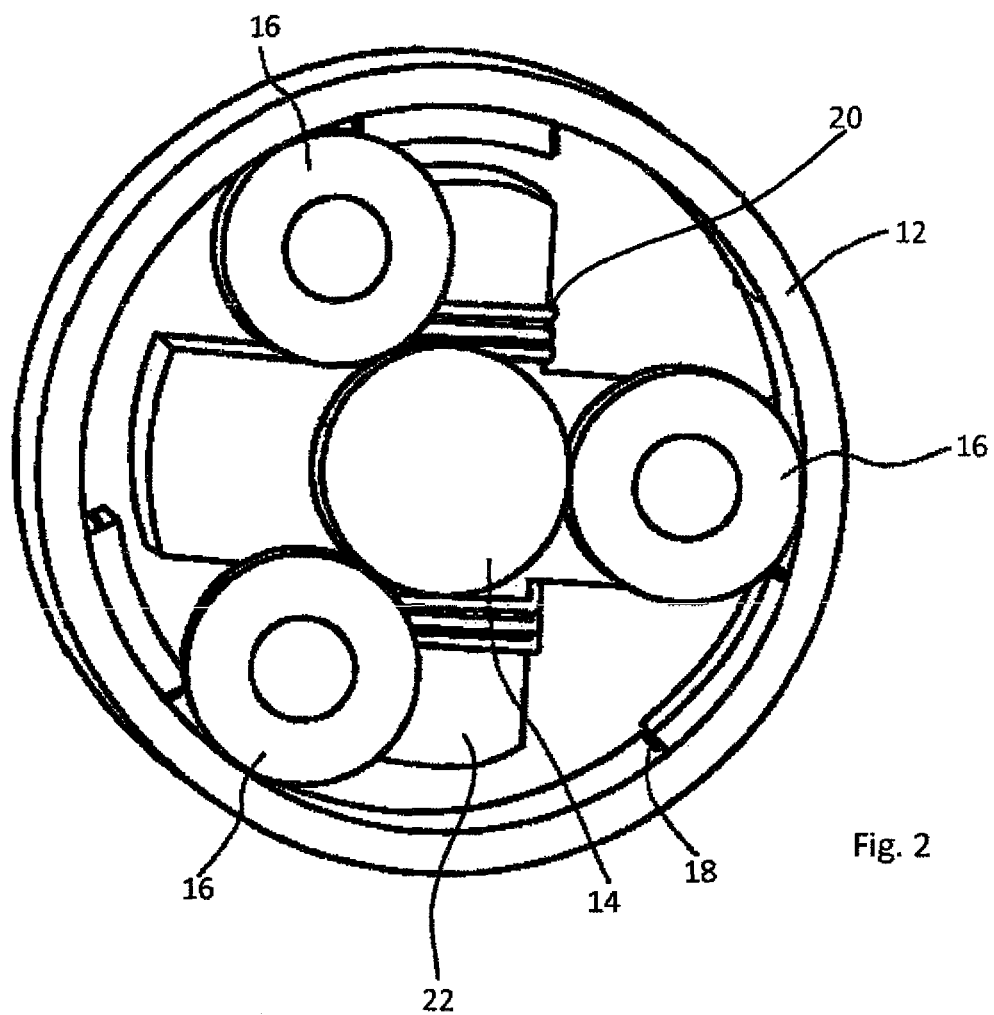
FIG. 2 a plan view of the damper according to the present invention of FIG. 1.

As further shown in FIG. 2, the damper 10 also includes several field generating means 18 for generating a primary magnetic field which are arranged in the ring gear, i.e. in the first gear element 12. In addition, the second gear element 14 formed as a sun gear has an extension in the form of an armature 22 with armature coils 20. In other words, a generator is integrated the planetary gear wherein the first gear element 12 formed as ring gear operates as a stator and the second gear element 14 formed as a sun gear operates as rotor, so that a current is induced in the armature windings 20 in a known manner when the armature 22 rotates in the primary magnetic field.

The damping effect is causes by the rotation of the rotor, i.e. the second gear element 14, in the primary magnetic field, whereby the energy extracted from system is not lost, but is recovered to a considerable degree through induction of the current.

Figure 3:
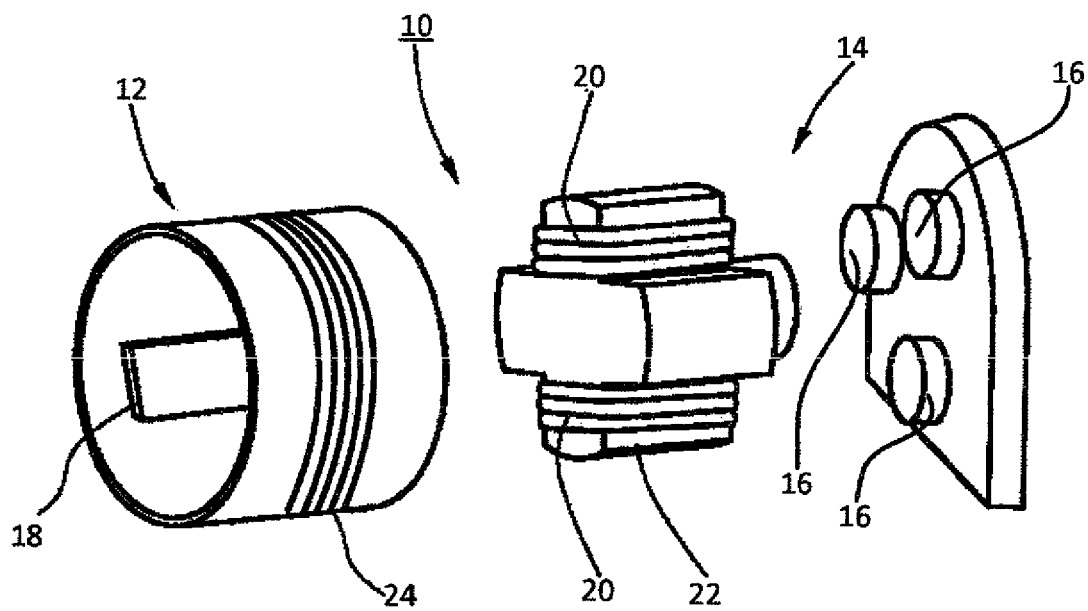
FIG. 3 an exploded view of the electric damper according to the present invention of FIG. 2.

As shown in FIG. 3, an additional field winding 24 is provided, which can be used to generate a secondary magnetic field. The additional field winding 24 is connected in series with the field-generating means 18 provided on the first gear element 12 that generate the primary magnetic field. The arrangement of the additional field winding 24 and the direction of the current flow through the additional field winding 24 are selected such that the field lines of the secondary magnetic field are oriented in a direction opposite to the field lines of the primary magnetic field.

Figure 4:
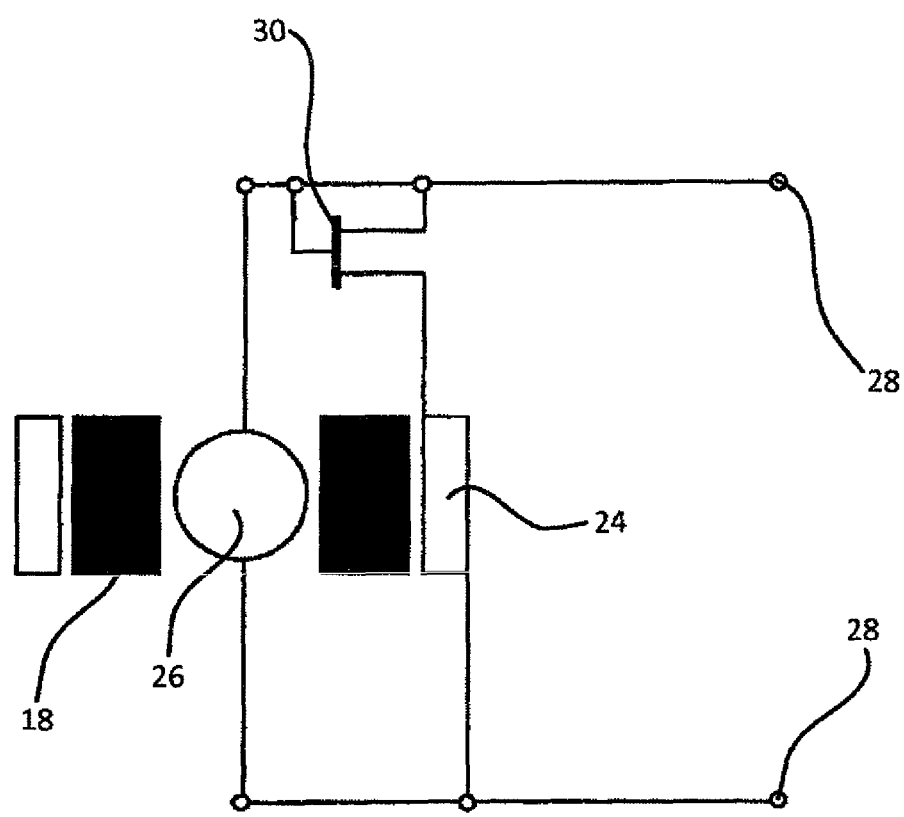
FIG. 4 a circuit arrangement for the additional field winding.

The electrical connection of the additional field winding is shown schematically in FIG. 4. In the schematic diagram of FIG. 4, the reference numeral 18 designates the field generating means for generating the primary magnetic field, the reference numeral 24 designates the additional field winding for generating the secondary magnetic field, and reference numeral 26 designates the generator.

A current is induced in the generator 26 through interaction with the primary magnetic field, with the current being discharged via the electrical connection to the two terminals 28. These terminals can be connected, for example, to the onboard electrical system.

The additional field winding 24 is energized only when the required switching voltage is reached at the transistor 30. When this switching voltage has been reached, the transistor 30 becomes conducting and energizes the additional field winding 24, which in turn causes buildup of the secondary magnetic field. Due to the previously discussed arrangement and selected direction of current flow through the additional field winding 24, the field lines of the secondary magnetic field are oriented opposite to the field lines of the primary magnetic field. In other words, the effective excitation field is weakened, thereby producing a degressive curve shape of the damping force.

Figure 5:
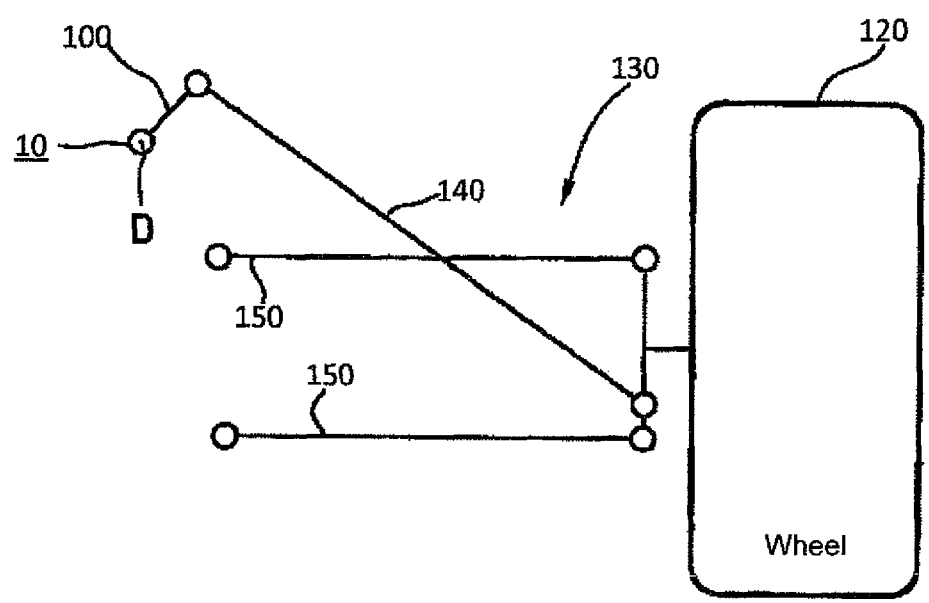
FIG. 5 a schematic diagram of a possible installation of the damper according to the present invention in the area of a motor vehicle axle, and FIG. 6 a schematic diagram of another embodiment of the damper according to the present invention.

A possible installation situation is shown in FIG. 5. As part of a motor vehicle, a wheel 120 together with a wheel carrier 130 is shown, wherein a push rod 140, which is for example connected to the lever element 100, is arranged on the wheel carrier 130. The lever element 100 is supported for rotation about the rotation axis D, wherein the damper 10 according to the invention is disposed in this rotation axis.

It would also be conceivable to integrate the damper 10 directly in the rotary suspension of one or both of the transverse control arms 150. In either case, the stator, i.e. the first gear element 12, is always connected to the drive, i.e. is the driving element, whereas the rotor, i.e. second gear element 14, is always the driven element. When the wheel 120 is now compressed or rebounds, the lever element 100 is moved so that it rotates about the axis of rotation D, via which the damper 10 according to the invention is operated in the aforedescribed manner.

Figure 6:
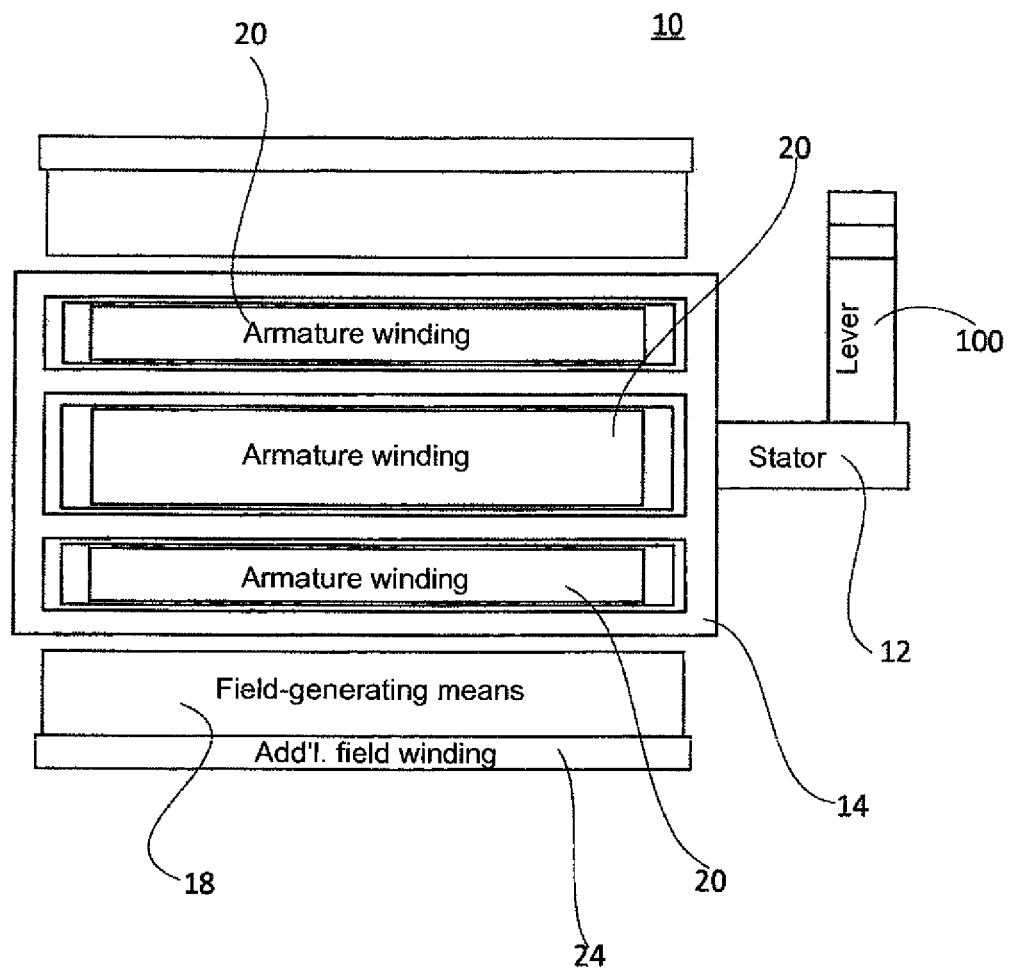

In the damper 10 illustrated in FIG. 6, the lever element 100 is connected directly to the rotor 14 of the generator. That means that a pivoting motion of the lever element 100 causes a direct rotation of the rotor 14.

The rotor 14 includes windings 20. Furthermore, field generating means 18 for generating a primary magnetic field are arranged outside the rotor 14. In the present example, the primary field generating means 18 are constructed as permanent magnets. A current is then induced in the windings 20 in a known manner through rotation of the rotor.

As further shown in FIG. 6, in addition to the primary field generating means 18 for generating the exciting magnetic field necessary for the induction, an additional field winding 24 is provided for generating a secondary magnetic field. The arrangement of the additional field winding 24 and the direction of current flow through the additional field winding 24 are selected such that the primary and the secondary magnetic field have field lines oriented in opposite directions.

As a result, the effective excitation field is weakened, i.e. a degressive damping force curve can be intentionally adjusted by controlling the current flow through the additional field winding 24.

The invention claimed is:

1. An electric damper for damping relative motion between a first and a second mass, comprising
    a generator driven by the relative motion between a first and a second mass,
    field generating means arranged in the generator for generating a primary magnetic field, and
    an additional field winding for generating a secondary magnetic field, wherein the additional field winding is arranged such that the primary and secondary magnetic field have field lines oriented in opposite directions.

2. The damper of claim 1, further comprising an electrical conductor arranged in the generator for conducting the induced current and connected to the additional field winding such that a portion of an induced current is supplied to the additional field winding only when the induced current exceeds a predetermined threshold value.

3. The damper of claim 1, wherein the field-generating means are constructed as a field winding for separate excitation or as permanent magnetic elements for self-excitation.

4. The damper of claim 1, wherein the generator is integrated in a gearbox.

5. The damper of claim 4, wherein the gearbox is constructed as a strain wave gear.

6. The damper of claim 4, wherein the gearbox is constructed as a planetary gear.

7. The damper of claim 4, wherein the gearbox is constructed as a cycloidal gear.

\* \* \* \* \*